United States Patent Office 3,505,118
Patented Apr. 7, 1970

3,505,118
FUEL CELL AND PROCESS FOR PRODUCING ELECTRIC CURRENT USING TITANIUM DIOXIDE CATALYST
Vinodkumar Mehra and William R. Wolfe, Jr., Wilmington, Del., assignors to E. I. du Pont de Nemours and Company, Wilmington, Del., a corporation of Delaware
No Drawing. Filed Dec. 5, 1966, Ser. No. 598,884
Int. Cl. H01m 27/04; B01j 11/06
U.S. Cl. 136—86                                 9 Claims

ABSTRACT OF THE DISCLOSURE

A relatively inexpensive catalyst for a fuel cell electrode, particularly useful with acid electrolytes, is a solid solution of at least one oxide of niobium, nickel, cobalt, molybdenum and titanium (other than titanium dioxide) in titanium dioxide.

RELATED APPLICATIONS

The following applications are referred to in this specification:

Ser. No. 404,435, now Patent No. 3,297,487, filed: Oct. 16, 1964
Ser. No. 530,295, filed: Feb. 28, 1966
Ser. No. 348,165, now abandoned, filed: Feb. 28, 1964

SUMMARY OF INVENTION

A fuel cell electrode having as a catalyst a solid solution of at least one oxide of niobium, nickel, cobalt, molybdenum and titanium (other than titanium dioxide) in titanium dioxide.

This invention relates generally to improved fuel cells and, more particularly, to improved anodes for use in fuel cells.

Fuel cell, as used herein, refers to a device capable of generating electrical energy from the oxidation of a fuel. Specifically, a fuel cell comprising a housing, two electrically conductive electrodes which may consist of or be impregnated with catalytic material, connecting means associated with each electrode for establishing electrical contact with an external circuit and an electrolyte which acts as a transferring medium for ions. An oxidizing gas such as air is supplied to the oxidant electrode (the cathode); and a fuel, such as hydrogen, methanol, formaldehyde, etc. is supplied to the fuel electrode (the anode). At the cathode, electrons are consumed to convert the oxidant into ions; and at the anode, the fuel is oxidized with the release of electrons. There is, therefore, a net flow of electrons from the anode to the cathode through the external electrical-conductive circuit. If the electrolyte is alkaline, then negative ions migrate to the anode to take part in the oxidation reaction. If the electrolyte is acid, then positive ions migrate to the cathode to take part in the reduction reaction.

Heretofore, the most successful anodes for use in fuel cells have either been formed of very expensive materials or have contained such materials as catalysts. Platinum, palladium, rhodium, silver and compounds of such materials have been used as anode catalysts and have tended to make the fuel cell commercially unattractive. Although less expensive materials have been suggested, none has provided sufficiently low cost per unit power, particularly for use with the more desirable acid electrolytes, to compete with platinum and the like for use as anodic catalyts in fuel cells.

In its broadest sense, the present invention provides a fuel cell in which the anode catalyst is a solid solution of at least one oxide of metal selected from the group consisting of niobium (columbium), nickel, cobalt, molybdenum and titanium (other than titanium dioxide) in titanium dioxide, molar ratio of said oxide-to-titanium dioxide being from 1:2 to 3:2. The oxides which may be dissolved in titanium dioxide include $Nb_2O$, $Nb_2O_5$, $NiO$, $Ni_2O_3$, $CoO$, $Co_2O_3$, $MoO$, $Mo_2O_3$, $MoO_2$, $Mo_2O_5$, $MoO_3$, $TiO$ and $Ti_2O_3$.

CATLYST PREPARATION

The catalyst may be prepared by dissolving at least one metal oxide, as set forth above, in molten titanium dioxide. Specifically, the metal oxide is mixed with titanium dioxide in suitable proportions and the mixture is arc melted using a tungsten, carbon of thorated tungsten electrode as the arc source. Several such meltings are preferred to provide a more homogeneous mixture, i.e. the initial melted material is ground and then remelted. The resulting solid solution should then be ground to a particle diameter of one to ten microns. However, the invention is not so limited since smaller and larger particles will also provide active catalysts.

It should be pointed out that the commercially available titanates may be useful in this invention. Many of these titanates are produced by forming a solid solution of a metal oxide and titanium dioxide as described above. Thus, niobium titanate is prepared from stoichiometric quantities of $Nb_2O_5$ and $TiO_2$ cobalt titanate from $CoO$ and $TiO_2$; nickel titanate from $NiO$ and $TiO_2$; molybdenum titanate from $MoO$ and $TiO_2$; etc.

ANODE PREPARATION

The anode of this invention is preferably composed of a base stratum that is usually an electrically conductive material, chemically resistant to the electrolyte, which supports the previously described catalytic material. Although any electrically conductive material including gold and those metals of Group VIII of the Periodic Table that are resistant to the electrolyte would be operable, it is preferred to use materials that are relatively inexpensive in order to retain the basic advantages of the catalyst. Suitable electrodes may be formed from tantalum, metal oxides, carbon, carbides, conductive ceramics, conductive polymeric compositions or the metal/silicon combinations disclosed in United States Patent application Serial No. 404,435, filed Oct. 16, 1964. The electrode base stratum may be used in sheet, rod or cylinder form or, preferably, in the form of a porous or foraminous base e.g. screen, mesh, wool, etc. to provide maximum surface area.

In the preferred process, the catalytic material is incorporated in a binder and the combination is applied to the electrically conductive base stratum under pressure. As the binder material, such polymers as chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

It should be understood, however, that it is not necessary that the catalytic material be incorporated with the electrode. Particles of the catalytic material may be suspended in the anolyte (the electrolyte in contact with the anode) as described in United States Patent application Serial No. 348,165, filed Feb. 28, 1964.

ELECTROLYTES

The electrolytes used in the fuel cells and half cells of this invention can be any of those commonly used which are compatible with the particular fuels, oxidants, permeable membranes, etc. being used. They will usually be aqueous solutions but can also be nonaqueous mixtures of adequate conductivity for the ions involved in the half cell reactions. The useful aqueous electrolytes include solutions of the alkali metal hydroxides, e.g. potassium hydroxide, sodium hydroxide; the common acids, e.g. sulfuric acid, phosphoric acid, hydrochloric acid; the alkaline salts, e.g. the chlorides, sulfates, or carbonates of sodium, potassium or lithium; etc. The concentrations involved will usually be chosen for high conductivity and convenient handling. For the purpose of the present invention, acidic electrolytes are preferred. Such electrolytes normally will produce gaseous waste products which are readily removed. Specifically, 5–45% sulfuric acid, 40–85% phosphoric acid, and 5–15% hydrochloric acid are recommended.

While it will usually be desirable to use the same electrolyte for the fuel and oxidant half cells in the fuel cell arrangements of this invention, the use of a common electrolyte is not essential. Two different electrolytes can be used by incorporating in the fuel cell design a suitable membrane which separates the electrolytes but permits adequate flow of ions between the half cells, e.g. the membrane disclosed in United States Patent application Serial No. 530,295 filed Feb. 28, 1966. Thus, one half cell can utilize a soluble fuel or oxidant in one electrolyte while the other half cell utilizes a gaseous or liquid fuel or oxidant with a suitable ion permeable membrane to prevent migration of the soluble fuel or oxidant to the other electrode.

FUELS AND OXIDANTS

While the catalysts described herein are particularly useful with low molecular weight hydrogenous fuels, the invention is not so limited. Besides hydrogen, the useful fuels include nitrogen-containing fuels like ammonia and hydrazine; oxygenated hydrocarbon fuels like formaldehyde, methanol, formic acid; and carbon monoxide; alone or mixed with other gaseous and liquid fuels. The selection of the particular fuel to be used will depend upon its availability and its degree and ease of oxidation in the presence of the particular electrolyte. In any event, the fuel should not react directly with the electrolyte or with the materials of cell construction.

The oxidizing agents that can be used are preferably air and pure oxygen. Other oxidants which might be considered include a nitrogen oxide such as nitric oxide or nitrogen dioxide, sulfur dioxide, chlorine, liquid hydrogen peroxide, liquid organic peroxides, nitric acid, etc. As with the fuels, some of these oxidants will be more useful with particular electrolytes and cathode catalysts than with others.

CATHODES

The cathode should be an electrical conductor, which will adsorb the fuel and will act as a catalyst for the electrode reaction. Suitable electrodes meeting these requirements are well known and many are described for example in "Catalysis, Inorganic and Organic," Berkman, Morrel, and Egloff, Rheinhold Publishing Co., New York (1940). Suitable electrode materials include electrodes formed from metals of Group VIII of the Periodic Table such as rhodium, palladium, iridium and platinum. In addition to the electrodes formed of these metals, the electrodes can be formed of platinum or palladium black which is deposited on a base metal such as stainless steel, iron, nickel and the like. In addition, suitable electrodes may be formed from the metal-silicon combination described in U.S. Patent application Serial No. 404,435, filed Oct. 16, 1964, or from metal oxides or from carbon which is activated with platinum or palladium or with oxides of iron, magnesium, cobalt, copper, etc.

The electrode materials may be used in sheet form or in the form of screens, meshes, or porous metals. They may be combinations of solid electrodes coated with porous catalysts bound with organic materials and plastics. It is also possible to use a combination cathode and solid oxidant. For example, the lead dioxide plate such as used in a storage battery may be used in the fuel cell of the invention: or, at least as a means for testing the effectiveness of fuels in the presence of the anodes and catalysts of the invention.

The temperature of operation of the fuel cell can range from about 20° C. to about 150° C., the pressure being atmospheric pressure. In general, more current can be drawn from a fuel cell at a constant potential when the temperature is increased. However, at temperatures above about 150° C. the corrosive action of the acidic electrolyte on metals in the fuel cell is accelerated.

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follow. These examples should not be considered to limit the invention in any way. Parts and percentages in the examples are by weight, unless otherwise stated.

Example 1

A solid solution of niobium pentoxide in titanium dioxide was prepared by mixing quantities of the oxides such that the molar ratio of niobium-to-titanium was approximately 1:1 and arc melting the mixture using a thoriated tungsten electrode. The resulting particulate material was ground and arc melted a second time to improve homogenization. The final material analyzed 46.9% niobium and 26.5% titanium; the amount of tungsten and thorium being less than 100 parts per million.

This material was tested as an anode catalyst by adding 10 grams of the material to the anolyte, 150 ml. of a 10% aqueous solution of sulfuric acid, of a test fuel cell. The fuel cell had been prepared by equipping a 250 ml. beaker with a one square inch 16-gauge plate of gold as the anode, a gold lead wire attached to the anode, a ¼-inch glass tube as a gas bubbler for feeding fuel to the anode, a lead dioxide cathode compartment insulated from the anode by an ion-exchange membrane and a saturated calomel electrode. The cell was equipped with a magnetic stirring device and tested at a temperature of 50° C. comparing the behavior of the cell when hydrogen was bubbled over the anode to its behavior without a fuel.

The results are presented in the following table:

| Anode potential vs. saturated calomel electrode (volts) | Anode current (milliamperes) | |
| --- | --- | --- |
| | No fuel | Hydrogen |
| +0.30 | .002 | 0.79 |
| +0.50 | .005 | 1.05 |
| +0.70 | .016 | 1.35 |

The open circuit potential with no fuel present was +0.15 volt. Upon feeding the hydrogen fuel to the anode, the open circuit potential dropped to −0.26 volt.

The decrease in open circuit potential and the increase in current available at the same potential difference when the fuel was used are indicative of the catalytic activity of the anode catalyst.

Example 2

Commercially obtained cobalt titanate, which is a solid solution of cobalt oxide in titanium dioxide, was tested as an anode catalyst in the manner described in Example 1. The test was performed at 70° C. with the following results:

| Anode potential vs. saturated calomel electrode (volts) | Anode current (milliamperes) | |
| --- | --- | --- |
| | No fuel | Hydrogen |
| +0.40 | 0.008 | 0.46 |
| +0.50 | 0.013 | 0.61 |
| +0.70 | 0.037 | 0.93 |

The open circuit potential with no fuel present was +0.27 volt. Upon feeding the hydrogen fuel to the anode, the open circuit potential dropped to −0.15 volt.

The decrease in open circuit potential and the increased catalytic currents when the fuel is used are indicative of the catalytic activity of the anode catalyst.

Example 3

Commercially obtained nickel titanate, which is a solid solution of nickel oxide in titanium dioxide, was tested as an anode catalyst in the manner described in Example 1. The test was performed at 50° C. with the following results:

| Anode potential vs. saturated calomel electrode (volts) | Anode current (milliamperes) | |
|---|---|---|
| | No fuel | Hydrogen |
| +0.20 | 0.005 | 0.22 |
| +0.40 | 0.013 | 0.35 |
| +0.50 | 0.019 | 0.45 |
| +0.70 | 0.045 | 0.70 |

The open circuit potential with no fuel present was +0.12 volt. Upon feeding the hydrogen fuel to the anode, the open circuit potential dropped to −0.15.

The decrease in open circuit potential and the increased catalytic currents when the fuel is used are indicative of the catalytic activity of the anode catalyst.

Example 4

11.2 grams of commercially obtained molybdenum titanate (a solid solution of molybdenum oxide in titanium dioxide) was ground to a −325 mesh powder and tested as an anode catalyst in the manner described in Example 1. The test was performed at 50° C. with the following results:

| Anode current (milliamperes) | Anode potential vs. saturated calomel electrode (volts) | |
|---|---|---|
| | No fuel | Hydrogen |
| 0 | +0.14 | −0.13 |
| 0.01 | +0.18 | −0.09 |
| 0.04 | +0.27 | −0.08 |
| 0.10 | +0.31 | −0.03 |
| 0.40 | +0.40 | +0.28 |

Example 5

Nine grams of $Ti_2O_3$ powder, a solid solution titanium oxide (TiO) in titanium dioxide, ground to a −325 mesh, was tested as an anode catalyst in the manner described in Example 1. The test was performed at 50° C. with the following results:

| Anode current (milliamperes) | Anode potential vs. saturated calomel electrode (volts) | |
|---|---|---|
| | No fuel | Hydrogen |
| 0 | +0.03 | −0.13 |
| 0.01 | +0.15 | −0.13 |
| 0.04 | +0.42 | −0.12 |
| 0.10 | +0.72 | −0.10 |
| 0.80 | (*) | +0.53 |

*Cannot obtain stated current.

The reduction in potential when hydrogen is used to obtain the same current as obtained when no fuel is used is indicative of the catalytic activity of the anode catalysts in Examples 4 and 5.

What is claimed is:

1. In a fuel cell comprising a housing, at least one fuel electrode, at least one oxidant electrode, catalytic material associated with at least said fuel electrode an aqueous electrolyte, said fuel electrode and said oxidant electrode being in contact with said electrolyte, and connecting means associated with each electrode for establishing electrical contact with an external circuit, the improvement wherein the catalytic material associated with the fuel electrode is a solid solution of at least one oxide of a metal selected from the group consisting of niobium, nickel, cobalt, molybdenum and titanium, other than titanium dioxide, in titanium dioxide.

2. A fuel cell as in claim 1 wherein said catalytic material associated with the fuel electrode is a solid solution of titanium oxide in titanium dioxide.

3. A fuel cell as in claim 1 wherein said catalytic material associated with the fuel electrode is niobium titanate.

4. A fuel cell as in claim 1 wherein said catalytic material associated with the fuel electrode is cobalt titanate.

5. A fuel cell as in claim 1 wherein said catalytic material associated with the fuel electrode is nicked titanate.

6. A fuel cell as in claim 1 wherein said catalytic material associated with the fuel electrode is molybdenum titanate.

7. A fuel cell as in claim 1 wherein said electrolyte is an acidic electrolyte.

8. In a process for producing electric current which comprises passing an oxidant into an aqueous electrolyte in proximity to a first electrode, said first electrode being at least partially submerged in said electrolyte passing a fuel into an aqueous electrolyte in proximity to a second electrode, said second electrode being partially submerged in said aqueous electrolyte and having associated therewith a catalyst for oxidizing said fuel in the presence of said electrolyte and connecting the unsubmerged portions of said electrodes through an external electrical circuit to provide an electric current in said external circuit, the improvement wherein the catalyst associated with said second electrode is a solid solution of at least one oxide of a metal selected from the group consisting of niobium, nickel, cobalt, molybdenum and titanium, other than titanium dioxide, in titanium dioxide.

9. A process as in claim 8 wherein said fuel is hydrogen.

References Cited

UNITED STATES PATENTS

| 2,605,238 | 7/1952 | Krantz | 252—469 |
| 2,850,355 | 9/1958 | Linz et al. | 23—51 |
| 2,914,596 | 11/1959 | Gorin et al. | 136—86 |
| 3,116,170 | 12/1963 | Williams et al. | 136—86 |
| 3,146,131 | 8/1964 | Linden et al. | 136—86 |
| 3,300,344 | 1/1967 | Bray et al. | 136—86 |

ALLEN B. CURTIS, Primary Examiner

U.S. Cl. X.R.

23—51; 136—120; 252—461, 469, 472